(12) United States Patent
Cho et al.

(10) Patent No.: US 9,078,231 B2
(45) Date of Patent: Jul. 7, 2015

(54) METHOD AND APPARATUS FOR COMPENSATING ESTIMATED LOCATION OF WIRELESS NETWORK ELEMENTS ESTIMATED FROM INFORMATION COLLECTED BY HETEROGENEOUS TERMINALS

(71) Applicant: Electronics and Telecommunications Research Institute, Daejeon (KR)

(72) Inventors: Young Su Cho, Daejeon (KR); Myung In Ji, Daejeon (KR); Yang Koo Lee, Cheongju (KR); Sang Joon Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 295 days.

(21) Appl. No.: 13/868,983

(22) Filed: Apr. 23, 2013

(65) Prior Publication Data

US 2013/0281116 A1  Oct. 24, 2013

(30) Foreign Application Priority Data

Apr. 24, 2012 (KR) ........................ 10-2012-0042750

(51) Int. Cl.
*H04W 64/00* (2009.01)
*G01S 5/00* (2006.01)
*G01S 5/02* (2010.01)

(52) U.S. Cl.
CPC ........... *H04W 64/003* (2013.01); *G01S 5/0036* (2013.01); *G01S 5/0252* (2013.01)

(58) Field of Classification Search
CPC ... G01S 5/0036; G01S 5/0252; H04W 64/003
See application file for complete search history.

(56) References Cited

U.S. PATENT DOCUMENTS

| | | | |
|---|---|---|---|
| 2005/0208952 A1* | 9/2005 | Dietrich et al. | 455/456.1 |
| 2010/0144366 A1* | 6/2010 | Ishii et al. | 455/456.1 |
| 2010/0159958 A1 | 6/2010 | Naguib et al. | |

FOREIGN PATENT DOCUMENTS

| | | |
|---|---|---|
| KR | 10-2010-0121903 B1 | 11/2010 |
| KR | 10-2012-0005192 A | 1/2012 |
| KR | 10-2012-0029976 A | 3/2012 |

* cited by examiner

*Primary Examiner* — Kashif Siddiqui

(57) ABSTRACT

A method and apparatus for compensating an estimated location of a wireless network element from information collected by heterogeneous terminals are provided. The method may include receiving information on a received signal strength indication (RSSI) of a wireless network element and location information of a heterogeneous terminal from the heterogeneous terminal by a wireless network element positioning server, compensating the information on the RSSI received from the heterogeneous terminal into information on an RSSI received from a predetermined reference terminal, using a difference value model of the RSSI of the wireless network element between heterogeneous terminals, the difference model generated in advance, and estimating a location of the wireless network element using the compensated information on the RSSI from the reference terminal and the received location information.

20 Claims, 7 Drawing Sheets

METHOD AND APPARATUS FOR COMPENSATING ESTIMATED LOCATION OF WIRELESS NETWORK ELEMENTS ESTIMATED FROM INFORMATION COLLECTED BY HETEROGENEOUS TERMINALS

CROSS-REFERENCE TO RELATED APPLICATION

This application claims the benefit of Korean Patent Application No. 10-2012-0042750, filed on Apr. 24, 2012, in the Korean Intellectual Property Office, the disclosure of which is incorporated herein by reference.

BACKGROUND

1. Field of the Invention

The present invention relates to a method and apparatus for compensating an estimated location of a wireless network element from information collected by heterogeneous terminals, which are capable of estimating a more accurate location of the wireless network element by compensating the information.

2. Description of the Related Art

Recently, a wireless fidelity (WiFi)-based positioning method may provide location information to a user of a wireless communication terminal in an indoor environment and the like, in which a global positioning system (GPS) is unavailable. As an example, the Skyhook Wireless of U.S. constructs a WiFi location database (DB) using a location information collecting method using vehicles. However, considering rapid growth in indoor navigation, indoor location based advertising services, and the like, a technology for constructing a WiFi location DB for providing automated location update and compensation while providing positioning accuracy almost in units of a room size and minimizing cost for collecting.

The WiFi positioning method is being widely used for following reasons.

First, recently, WiFi access points (AP) are spread more and more to reduce a network transmission load caused by large-capacity data transmission. For example, three major mobile communication companies of Korea are competitively constructing the WiFi AP, aiming at supplying two hundred thousand or more of the WiFi APs by the end of 2011 nationwide. Furthermore, those mobile communication companies are planning to supply the WiFi APs to about a thousand of main government and public offices including airports, railway stations, bus terminals, public organizations, and the like, by the first half of 2012.

Second, smart phones that support connection between 3-generation (3G) and WiFi are being spread quite rapidly. Allegedly by Gartner, a market research firm, the supplied number of smart phones is predicted to reach about 57 hundred billions, that is, about 31.5% of the entire number of mobile communication terminals throughout the world, in 2012.

Third, various WiFi-based positioning methods of city levels are being developed. Representatively, a fingerprinting method compares a pre-stored signal pattern with WiFI scan information and determines a location corresponding to a signal pattern most similar to the pre-stored signal pattern as a location of the terminal. The fingerprinting method may increase accuracy of terminal positioning by reducing intervals of collecting the WiFi scan information. Also, according to the fingerprinting method, location information of a WiFi AP is unnecessary. However, considering a pattern characteristic of the fingerprinting method, which is sensitive to variation of indoor environments, WiFi scan information needs to be collected periodically, consequently increasing the cost.

Another example of the WiFi-based positioning methods is a wardriving-based WiFi AP positioning method. This method composites GPS locations of vehicles and WiFi scan information through wardriving, thereby estimating a WiFi AP location. The wardriving method is capable of quickly collecting the WiFi scan information and obtaining more accurate information using a dedicated collecting device. However, as to the estimated AP location, accuracy is not sufficiently high, being about 10 m to 20 m.

Last, a user-involved WiFi AP positioning method is being actively researched in these days. The user-involved WiFi AP positioning method collects an indoor reference location and WiFi scan information through contribution by a check-in service of users of terminals including a heterogeneous WiFi chipset, and estimates a location of a WiFi AP using the indoor reference location and the WiFi scan information. Since the indoor information is collected using a smart phone, accuracy in the estimated AP location is relatively higher in comparison to the wardriving method. Also, real-time recollecting is possible by many and unspecified contribution. However, the user-involved WiFi AP positioning method uses measurement information provided by a heterogeneous smart phone, not by a dedicated device. Accordingly, there is a desire for a method for normalizing and compensating the measurement information.

SUMMARY

An aspect of the present invention provides a method and apparatus for compensating an estimated location of a wireless network element, estimated from information collected by a heterogeneous terminal, the method and apparatus capable of estimating the location of the wireless network element more accurately by compensating a received signal strength indication (RSSI) received from the heterogeneous terminal.

According to an aspect of the present invention, there is provided a positioning method implemented by a computer, the positioning method including receiving information on a received signal strength indication (RSSI) of a wireless network element and location information of a heterogeneous terminal from the heterogeneous terminal by a wireless network element positioning server, compensating the information on the RSSI received from the heterogeneous terminal into information on an RSSI received from a predetermined reference terminal, using a difference value model of the RSSI of the wireless network element between heterogeneous terminals, the difference model generated in advance, and estimating a location of the wireless network element using the compensated information on the RSSI from the reference terminal and the received location information.

The information on the RSSI received from the heterogeneous terminal may include information measured in the heterogeneous terminal that communicates with the wireless network element.

The information on the RSSI received from the heterogeneous terminal may be compensated into the information on the RSSI received from the reference terminal, by differentiating an average of difference values of the RSSI of the wireless network element between the heterogeneous terminals in the RSSI of the heterogeneous terminal.

The estimating of the location of the wireless network element may include estimating the location of the wireless network element using a weighted least square utilizing the information on the RSSI received from the reference terminal.

The positioning method may further include after the estimating, estimating the location of the wireless network element using a trilateration method utilizing the information on the RSSI received from the reference terminal with reference to the estimated location of the wireless network element.

The difference value model of the RSSI of the wireless network element between the heterogeneous terminals may be generated based on analysis of characteristics with respect to the RSSI received from each heterogeneous terminal.

The positioning method may further include constructing a database (DB) using the difference value model of the RSSI between the heterogeneous terminals.

The DB may store at least one selected from an average of difference values of the RSSI of the wireless network element between the heterogeneous terminals, a distribution of the difference values of the RSSI of the wireless network element between the heterogeneous terminals, and a standard deviation of the difference values of the RSSI of the wireless network element between the heterogeneous terminals.

According to another aspect, reliability of the compensated information on the RSSI received from the reference terminal may be estimated, using at least one selected from the distribution of the difference values of the RSSI of the wireless network element between the heterogeneous terminals and the standard deviation of the difference values of the RSSI of the wireless network element between the heterogeneous terminals.

According to another aspect, a heterogeneous terminal that normalizes the information on the RSSI received from the heterogeneous terminal may be selected among a plurality of heterogeneous terminals, as the reference terminal.

According to another aspect of the present invention, there is provided a positioning server for a wireless network element, the positioning server including an information receiving unit to receive information on received signal strength indication (RSSI) of a wireless network element and location information of a heterogeneous terminal from the heterogeneous terminal, an RSSI compensation unit to compensate the information on the RSSI received from the heterogeneous terminal into information on an RSSI received from a predetermined reference terminal, using a difference value model of the RSSI of the wireless network element between heterogeneous terminals, the difference model generated in advance, and a location estimation unit to estimate a location of the wireless network element using the compensated information on the RSSI from the reference terminal and the received location information.

Effect

According to embodiments of the present invention, a model is generated with respect to a difference in a received signal strength indication (RSSI) between heterogeneous terminals based on an RSSI of a wireless network element measured in the heterogeneous terminals, and the RSSI of the wireless network element is compensated using the model for estimation of a location of the wireless network element. Accordingly, the location of the wireless network element may be estimated more accurately.

According to embodiments of the present invention, measurement information of the wireless network element, collected by dividing a wide indoor and outdoor region by dedicated heterogeneous collecting devices or dedicated collectors may be normalized for use. Therefore, time and cost for generating and expanding a location DB of the wireless network element may be reduced.

Additionally, according to embodiments of the present invention, measurement information of the wireless network element provided in real time by users of heterogeneous terminals from a wide indoor and outdoor region is normalized. Therefore, time and cost for updating a location DB of the wireless network element by a user-involved method may be reduced.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout.

Figure 1:
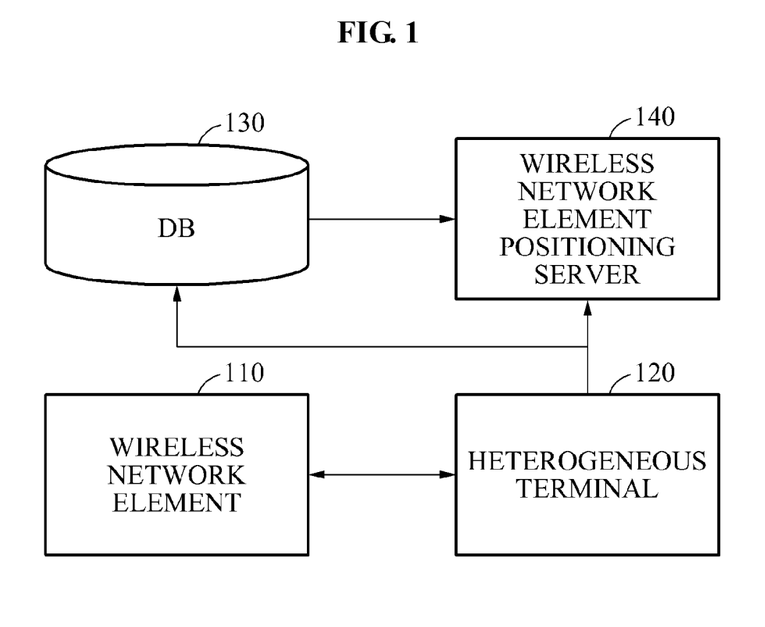
FIG. 1 is a block diagram illustrating a wireless network element positioning system for compensating an estimated location of the wireless network element, according to an embodiment of the present invention.

FIG. 1 is a block diagram illustrating a wireless network element positioning system for compensating an estimated location of the wireless network element, according to an embodiment of the present invention.

The wireless network element positioning system comprises a wireless network element 110, a heterogeneous terminal 120, a DB 130, and a wireless network element positioning server 140.

The wireless network element 110 may include a wireless communication infrastructure adapted to transmit and receive information with respect to a communication module. For example, the wireless network element 110 may include, as the wireless communication infrastructure, a mobile communication module capable of communicating with the heterogeneous terminal 120 and a near field communication (NFC) module capable of communicating with the heterogeneous terminal 120. Here, standards of the mobile communication module may include code division multiple access (CDMA), global system for mobile communication (GSM), wideband CDMA (WCDMA), long term evolution (LTE), wireless broadband (WiBro), world interoperability for microwave access (WiMax), femto cell, and the like. Standards of the NFC module may include wireless fidelity (WiFi), frequency identifier (RFID), NFC, Bluetooth, and the like.

The heterogeneous terminal 120 may include a wireless network interface card or wireless network interface chip for measuring received signal strength indication (RSSI) and a positioning module for calculating a current terminal location. The heterogeneous terminal 120 may be a mobile communication terminal or a computing device. For example, the heterogeneous terminal 120 may include not only a smart phone but also a notebook, a tablet PC, a net book, and the like to which the wireless network interface card or chip and the positioning module are mounted internally or externally.

The heterogeneous terminal 120 may include the wireless network interface cards or chips produced by different manufacturers according to a model of each terminal. For example, the heterogeneous terminal 120 which communicates with a WiFi access point (AP), one of the wireless network element, may include WiFi interface cards of different manufacturers according to a manufacturer of the heterogeneous terminal 120.

The wireless network interface card or chip of different manufacturers may have different characteristics of received signal strength indications (RSSIs). Therefore, the RSSI of the wireless network element measured in the heterogeneous terminal 120 may also be differed according to the wireless network interface card or chip included in the heterogeneous terminal 120.

The DB 130 may store information on the RSSI of the wireless network element 110 measured in the heterogeneous terminal 120. For example, the DB 130 may statistical values such as an average, a standard deviation, and a distribution related to a difference value between RSSIs measured in the heterogeneous terminal 120 for each wireless network element 110, in an environment having a minimum signal propagation error. In general, when n denotes a number of types of the heterogeneous terminal 120, a number of combinations of the difference values of the RSSI between heterogeneous terminals 120, stored in the DB 130, may be $_nC_2$.

The wireless network element positioning server 140 may receive the information on the RSSI of at least one wireless network element 110 and terminal location information being calculated, from the heterogeneous terminal 120. In addition, after arranging information collected by the heterogeneous terminal 120 according to the wireless network element 110, the wireless network element positioning server 140 may be provided with the difference value of the RSSI between the heterogeneous terminals 120 according to the wireless network element 110, thereby compensating the information on the RSSI of a plurality of heterogeneous terminals 120 with respect to a common wireless network element 110 into information on an RSSI received from a reference terminal Using the compensated information on the RSSI received from the reference terminal and the terminal location information being calculated, the wireless network element positioning server 140 may estimate the location of the wireless network element.

For this, the wireless network element positioning server 140 may include an information receiving unit to receive the information on the RSSI of the wireless network element 110 and the location information of the heterogeneous terminal 120 from the heterogeneous terminal 120, an RSSI compensation unit to compensate the information on the RSSI received from the heterogeneous terminal 120 into information on an RSSI received from a predetermined reference terminal, using a difference value model of the RSSI of the wireless network element 110 between the heterogeneous terminals 120, the difference model generated in advance, and a location estimation unit to estimate the location of the wireless network element 110 using the compensated information on the RSSI received from the reference terminal and the received location information. Here, the information on the RSSI of the wireless network element 110 received from the heterogeneous terminal 120 may be information measured in the heterogeneous terminal 120 which communicates with a corresponding wireless network element 110.

For example, the RSSI compensation unit may differentiate an average of difference values of the RSSI of the wireless network element 110 between the heterogeneous terminals 120 in the RSSI of the wireless network element 110 received from the heterogeneous terminal 120, so as to compensate the information on the RSSI received from the heterogeneous terminal 120 into the information on the RSSI received from the reference terminal.

Therefore, the location estimation unit may estimate the location of the wireless network element 110 using a trilateration method with reference to the information on the RSSI received from the reference terminal, being compensated by the RSSI compensation unit.

The difference value model of the RSSI of the wireless network element 110 between the heterogeneous terminals 120 may be generated based on analysis of characteristics with respect to the RSSI received from each heterogeneous terminal 120 and may be stored in the DB 130.

For example, the DB 130 may store at least one selected from an average of difference values of the RSSI of the wireless network element between the heterogeneous terminals, a distribution of the difference values of the RSSI of the wireless network element between the heterogeneous terminals, and a standard deviation of the difference values of the RSSI of the wireless network element between the heterogeneous terminals.

The wireless network element positioning server 140 may further include a reliability estimation unit. Therefore, the wireless network element positioning server 140 may estimate reliability of the compensated information on the RSSI received from the reference terminal, using at least one selected from the distribution of the difference values of the RSSI of the wireless network element 110 between the heterogeneous terminals 120 and the standard deviation of the difference values of the RSSI of the wireless network element 110 between the heterogeneous terminals 120, which are stored in the DB 130.

In addition, the wireless network element positioning server 140 may further include a reference terminal selection unit to select a heterogeneous terminal that normalizes the information on the RSSI received from the heterogeneous terminal 120 as the reference terminal, among a plurality of the heterogeneous terminals 120.

The reference terminal denotes an object terminal of normalization of the RSSI. Through the normalization, the information measured in the heterogeneous terminals 120 may be converted into the information measured in one reference terminal.

Figure 2:
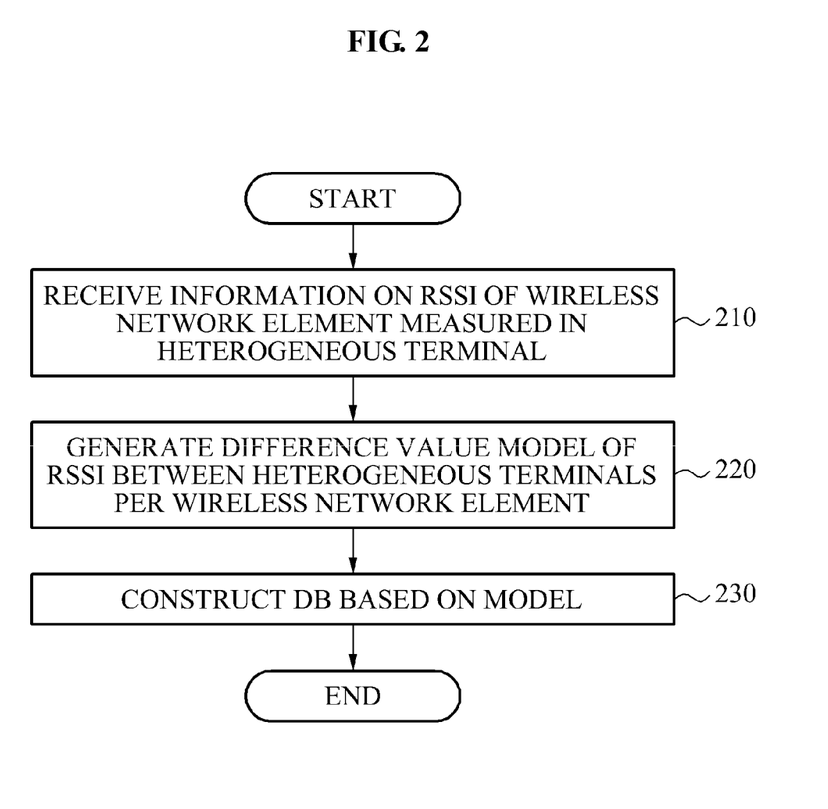
FIG. 2 is a flow chart illustrating a process of constructing a database (DB) to store information on a difference value of a received signal strength indication (RSSI) between heterogeneous terminals per wireless network element, according to an embodiment of the present invention.
Figure 3:
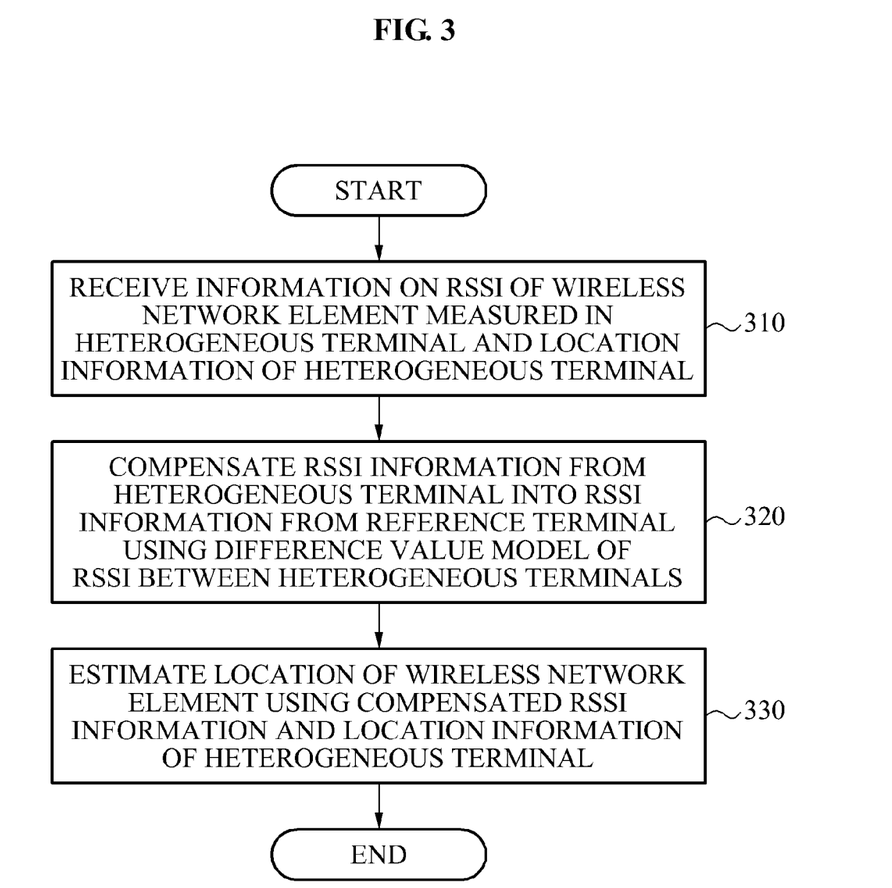
FIG. 3 is a flow chart illustrating a method of estimating a location of the wireless network element using information collected in a heterogeneous terminal, according to an embodiment of the present invention.

FIG. 2 is a flow chart illustrating a process of constructing a DB to store information on a difference value of an RSSI between heterogeneous terminals per wireless network element, according to an embodiment of the present invention. FIG. 3 is a flow chart illustrating a method of estimating a location of the wireless network element using information collected in a heterogeneous terminal, according to an embodiment of the present invention.

The DB construction process shown in FIG. 2 may be performed offline while the location estimation process for the wireless network element as shown in FIG. 3 may be performed online. The DB construction process may be performed independently from the location estimation process.

Referring to FIG. 2, when receiving information on the RSSI of the wireless network element, measured in a heterogeneous terminal according to the wireless network element, in an environment having a minimum signal propagation error, in operation 210, the wireless network element positioning server may generate a difference value model of the RSSI between the heterogeneous terminals per the wireless network element based on the received information in operation 220, and construct the DB based on the difference value model. Here, the environment having the minimum signal propagation error may mean an ideal signal propagation environment not having any interfering factors and obstructive installations.

For example, the difference value model of the RSSI of the wireless network element between the heterogeneous terminals may be generated based on analysis of characteristics of the RSSI received from each heterogeneous terminal.

The DB may store at least one selected from an average of difference values of the RSSI of the wireless network element between the heterogeneous terminals, a distribution of the difference values of the RSSI of the wireless network element between the heterogeneous terminals, and a standard deviation of the difference values of the RSSI of the wireless network element between the heterogeneous terminals.

Next, referring to FIG. 3, the wireless network element positioning server may receive the information on the RSSI measured from the wireless network element by each heterogeneous terminal and location information of the heterogeneous terminal being calculated, in operation 310. Here, the calculated terminal location refers to a location at which the measured information is collected. The location may be known in advance through actual measurement or calculated in real time using a map, another positioning sensor, or the like.

For more accurate estimation of the location of the wireless network element, the information on the RSSI received from the heterogeneous terminal may be compensated into the information on the RSSI received from a predetermined reference terminal, using the difference value model of the RSSI of the wireless network element between the heterogeneous terminals, the difference value model generated in advance, in operation 320.

For example, the wireless network element positioning server may differentiate an average of difference values of the RSSI of the wireless network element between the heterogeneous terminals, in the RSSI of the wireless network element received from the heterogeneous terminal, so as to compensate the information on the RSSI received from the heterogeneous terminal into the information on the RSSI received from the reference terminal.

When the information on the RSSI is thus compensated, the wireless network element positioning server may estimate the location of the corresponding wireless network element, using the compensated information on the RSSI received from the reference terminal and the terminal location information being calculated, in operation 330.

Here, the estimation of the location of the wireless network element may be divided into initial estimation and precise estimation. The initial estimation estimates the location of the wireless network element using a weighted least square that utilizes the compensated RSSI information. The precise estimation estimates the location of the wireless network element using a trilateration method that utilizes the RSSI information compensated based on the initially estimated location of the wireless network element.

The wireless network element positioning server may estimate the location of the wireless network element using only the initial estimation or only the accurate estimation.

Figure 4:
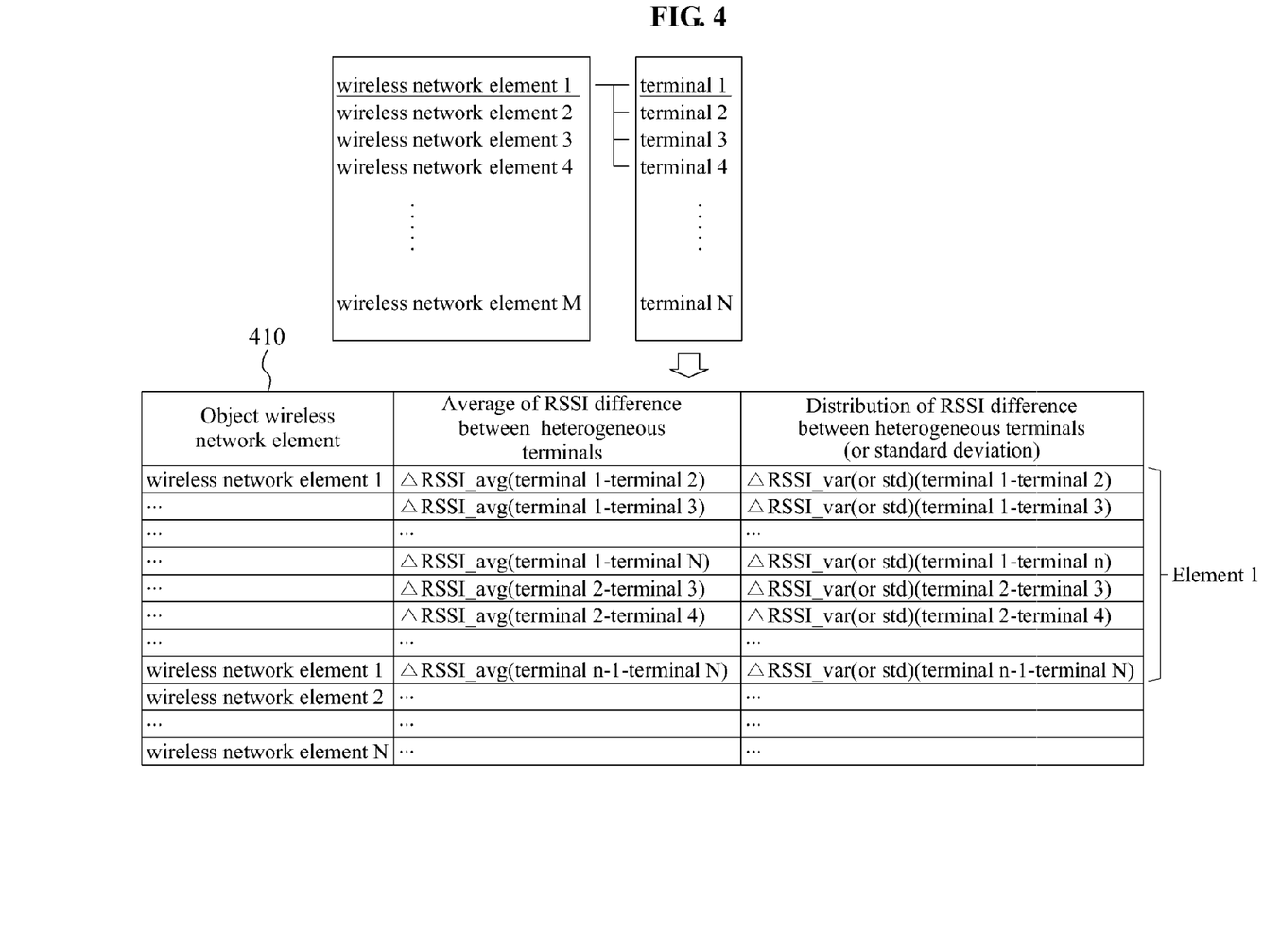
FIG. 4 is a diagram illustrating a configuration of a DB to store information on a difference value of an RSSI between heterogeneous terminals per wireless network element, according to an embodiment of the present invention.

FIG. 4 is a diagram illustrating a configuration of a DB to store information on a difference value of an RSSI between heterogeneous terminals per wireless network element, according to an embodiment of the present invention.

The DB may be used in compensating the information on the RSSI of the wireless network element with respect to heterogeneous terminals having different characteristics according to wireless network interface cards or chips mounted in the heterogeneous terminals, into the RSSI information of the wireless network element with respect to the reference terminal. For this purpose, the information on the RSSI may be stored in the DB in the form of a table 410 as shown in FIG. 4.

Columns in the table 410 may include an object wireless network element, an average of difference values of the RSSI between the heterogeneous terminals, a distribution or standard deviation of the difference values of the RSSI between the heterogeneous terminals, and the like.

Each wireless network element may include identification (ID) information to be identified. For example, for a WiFi AP, MAC address or subsystem ID (SSID) may be used as the ID. For a base station, a combination of mobile country code (MCC), mobile network code (MNC), location area code (LAC), cell identifiers (CI), and the like may be used.

The average of the difference values of the RSSI between the heterogeneous terminals may refer to an average of difference value samples of the RSSI collected from an environment having a minimum signal propagation error with respect to the object wireless network element.

The distribution or standard deviation of the RSSI between the heterogeneous terminals may refer to a distribution or standard deviation of the difference value samples of the RSSI collected from the environment having a minimum signal propagation error with respect to the object wireless network element.

The DB may store difference values of samples measured with respect to all combinations of two heterogeneous terminals used for measurement for each wireless network element, the average of the difference values, and the distribution or standard deviation of the difference values.

In detail, the difference value model of the RSSI between the heterogeneous terminals is obtained by Equation 1.

$$\Delta \overline{RSSI}_{Dev1-DevN} = \frac{1}{M}\sum_{k=1}^{M}(RSSI_{k,Dev1} - RSSI_{k,DevN}) \quad \text{[Equation 1]}$$

$$\Delta \overline{RSSI}_{Dev2-DevN} = \frac{1}{M}\sum_{k=1}^{M}(RSSI_{k,Dev2} - RSSI_{k,DevN})$$

$$\ldots$$

$$\Delta \overline{RSSI}_{Dev(N-1)-DevN} = \frac{1}{M}\sum_{k=1}^{M}(RSSI_{k,Dev(N-1)} - RSSI_{k,DevN})$$

Here, RSSI denotes the received signal strength indication (RSSI), DevN denotes a reference terminal, M denotes a number of samples of measured values, and k denotes a view angle.

When the reference terminal for normalizing the RSSI information of the heterogeneous terminal is selected, the wireless network element positioning server may search the DB and receive the difference value model of the RSSI between the heterogeneous terminals as in Equation 1. Using the difference value model, the wireless network element positioning server may compensate the RSSI with respect to an N-number of heterogeneous terminals into an RSSI with respect to the reference terminal N as in Equation 2.

$$RSSI_{k,DevN\_Corr} =$$
$$RSSI_{k,Dev1} - \Delta\overline{RSSI}_{Dev1-DevN}(\text{Terminal1} \to \text{Terminal } N)$$

[Equation 2]

or $$RSSI_{k,DevN\_Corr} =$$
$$RSSI_{k,Dev2} - \Delta\overline{RSSI}_{Dev2-DevN}(\text{Terminal2} \to \text{Terminal } N)$$

or

...

or $$RSSI_{k,DevN\_Corr} = RSSI_{k,Dev(N-1)} -$$
$$\Delta\overline{RSSI}_{Dev(N-1)-DevN}(\text{Terminal}(N-1) \to \text{Terminal } N)$$

Here, a terminal collecting most measured information or a terminal having most stable wireless network receiving characteristics may be selected from a plurality of the heterogeneous terminals as the reference terminal. The reference terminal may be selected according to a measurement scenario.

That is, when receiving the difference value model of the RSSI between the heterogeneous terminals from the DB, the wireless network element positioning server may differentiate the average of the difference values of the RSSI of the wireless network element between the heterogeneous terminals in the RSSI of a heterogeneous terminal used for measuring the location of the wireless network element, thereby compensating the information on the RSSI received from the heterogeneous terminal into the information on the RSSI received from the reference terminal.

The distribution or the standard deviation of the difference values of the RSSI of the wireless network element between the heterogeneous terminals may be used for estimating reliability of the information on the RSSI received from the reference terminal, which is compensated by the wireless network element positioning server.

Figure 5:
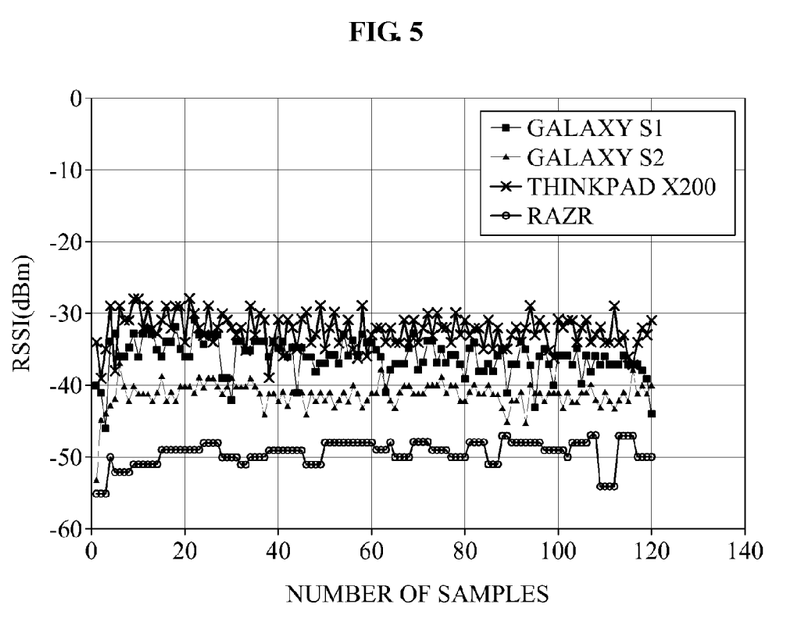
FIG. 5 is a graph illustrating distribution characteristics of an RSSI measured in a heterogeneous terminal, according to an embodiment of the present invention.
Figure 6:
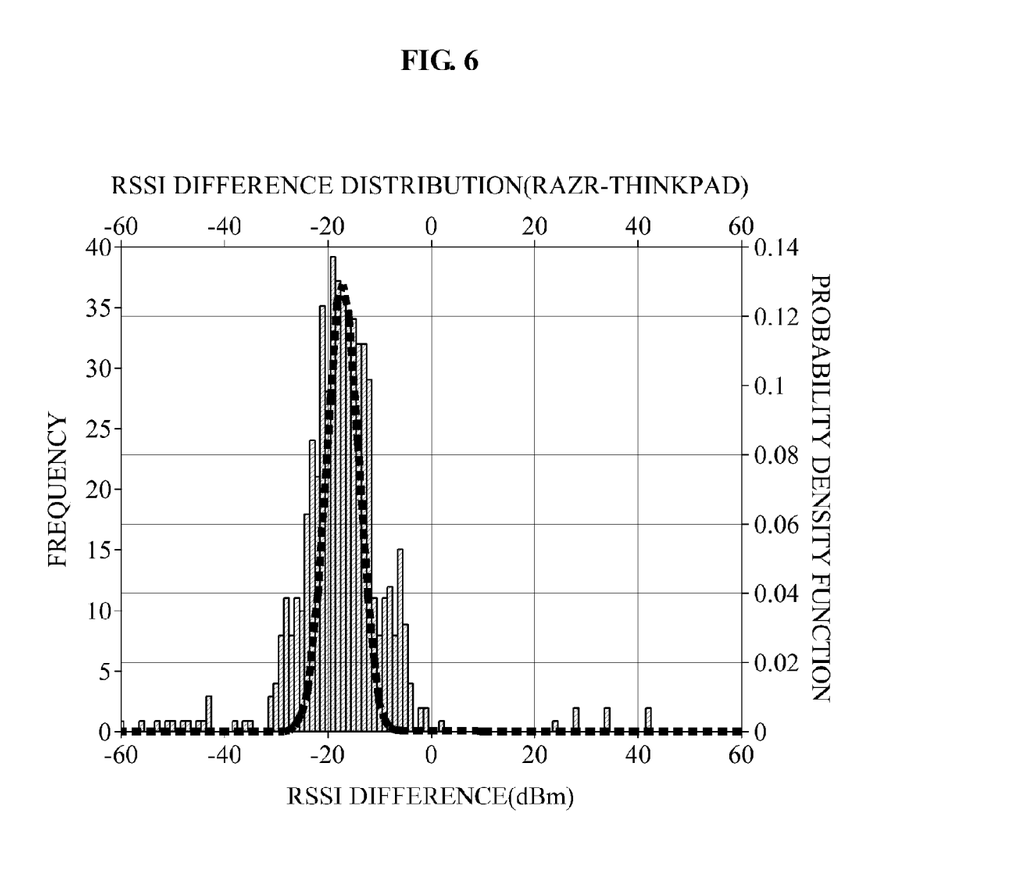
FIG. 6 is a graph illustrating distribution characteristics of difference values between heterogeneous terminals, according to an embodiment of the present invention.

FIG. 5 is a graph illustrating distribution characteristics of an RSSI measured in a heterogeneous terminal, according to an embodiment of the present invention. FIG. 6 is a graph illustrating distribution characteristics of difference values between heterogeneous terminals, according to an embodiment of the present invention.

The distribution of the RSSI per heterogeneous terminal in a DB may be in the form of normal distribution having a deviation as shown in FIG. 5. As an example, a distribution characteristic of the RSSI measured in four heterogeneous terminals with respect to WiFi AP is shown in FIG. 5.

Since a deviation between the heterogeneous terminals is about 20 dbm or more to the maximum, without compensation of the deviation, accuracy in estimating the location of the wireless network element is reduced.

The average of difference values between the heterogeneous terminals is generally in the form of normal distribution as shown in FIG. 6.

Therefore, when information on an m-number of RSSIs compensated by the reference terminal with respect to a p-number of heterogeneous terminals and location information of the heterogeneous terminals are provided with respect to a common wireless network element 1, the wireless network element positioning server may measure the location of the wireless network element using Equation 3.

$$AP_{L,x} = \sum_{k=1}^{m} \left( CP_{k,x} \times \frac{10^{\left(\frac{-(RSSI_0 - RSSI_{k,DevN\_corr})}{10 \times \alpha}\right)^s}}{\sum_{j=1}^{m} 10^{\left(\frac{-(RSSI_0 - RSSI_{j,DevN\_corr})}{10 \times \alpha}\right)^s}} \right)$$

[Equation 3]

$$AP_{L,y} = \sum_{k=1}^{m} \left( CP_{k,y} \times \frac{10^{\left(\frac{-(RSSI_0 - RSSI_{k,DevN\_corr})}{10 \times \alpha}\right)^s}}{\sum_{j=1}^{m} 10^{\left(\frac{-(RSSI_0 - RSSI_{j,DevN\_corr})}{10 \times \alpha}\right)^s}} \right)$$

Here, $\alpha$ denotes a signal attenuation coefficient and s denotes a scale factor.

In an embodiment, the wireless network element positioning server may perform initial estimation of the location of the wireless network element using a weighted least square method that utilizes the compensated information on the RSSI as in Equation 3. In addition, next, precise estimation for the location of the wireless network element may be performed using a trilateration method that utilizes the information on the RSSI compensated with reference to the initially estimated value. Accordingly, the location of the wireless network element may be more accurately estimated.

As another embodiment, the wireless network element positioning server may perform only the initial estimation or only the precise estimation.

Thus, since the model with respect to the difference values of the RSSI between the heterogeneous terminals is generated based on the RSSI of the wireless network element measured by the heterogeneous terminals, and the RSSI of the wireless network element measured in the heterogeneous terminals is compensated using the model, the location of the wireless network element may be estimated more accurately.

In addition, information of the wireless network element, collected by dividing a wide indoor and outdoor region by dedicated heterogeneous collecting devices or dedicated collectors may be normalized for use. Therefore, time and cost for generating and expanding a location DB of the wireless network element may be reduced.

Measurement information of the wireless network element provided in real time by users of heterogeneous terminals from a wide indoor and outdoor region is normalized. Therefore, time and cost for updating a location DB of the wireless network element by a user-involved method may be reduced.

Figure 7:
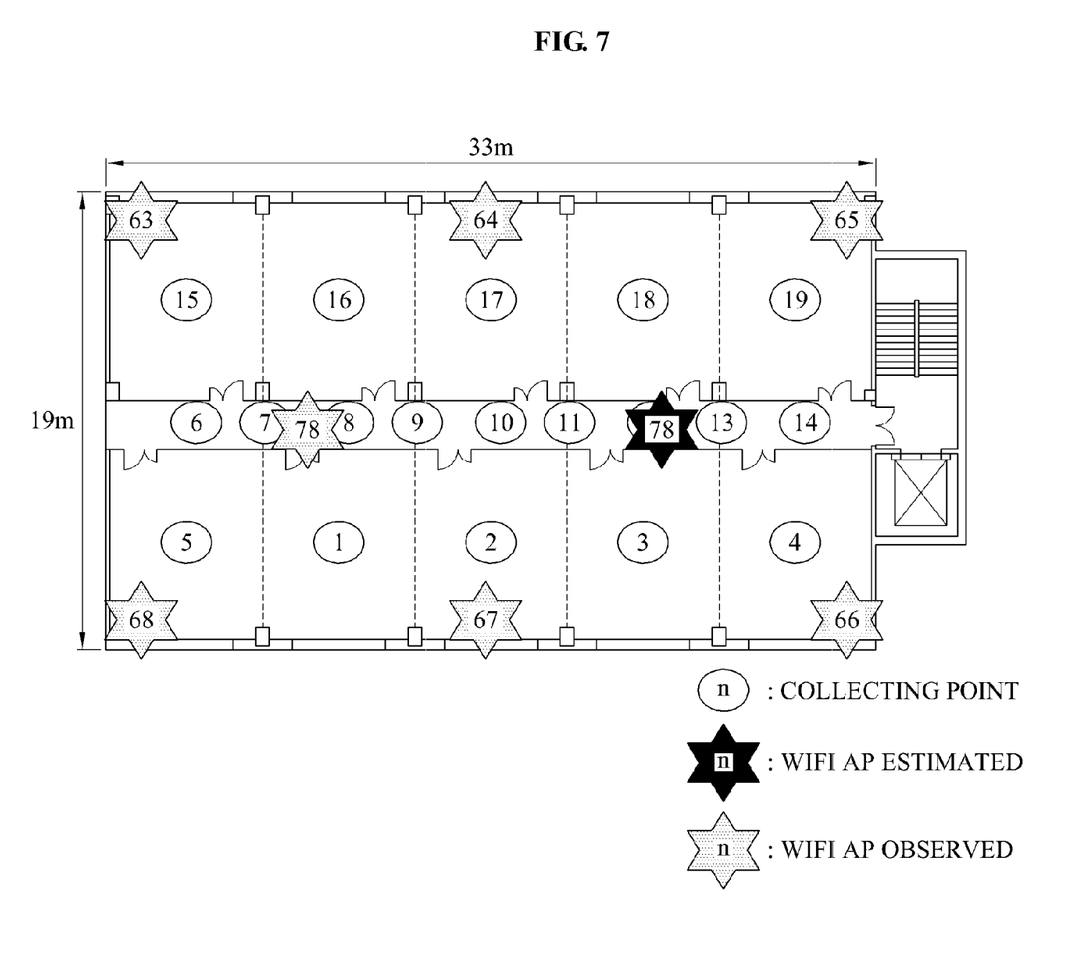
FIG. 7 is a diagram illustrating a test bed environment for evaluating performance of the wireless network element, according to an embodiment of the present invention.

FIG. 7 is a diagram illustrating a test bed environment for evaluating performance of the wireless network element, according to an embodiment of the present invention.

To verify the method suggested by the embodiments of the present invention, a plurality of pieces of RSSI information and terminal locations are measured with respect to a particular wireless network element, for example, a WiFi AP, in the test bed environment as shown in FIG. 7. Using a DB storing difference values of the RSSIs of the wireless network element between heterogeneous terminals, location estimation performance of the wireless network element is compared between before and after compensation.

In the test bed environment, measurement points may be divided into a public measurement point and a private measurement point.

The public measurement point may refer to a spot easy to be accessed by general people, such as a shopping mall, a station building, a hallway of a department store, a hall, a lobby, and the like. Measurement points 6 to 14 in FIG. 7 are the public measurement points. The private measurement point may refer to a room or district having a limited access thereto. Measurement points 1 to 5, and 15 to 19 in FIG. 7 are the private measurement points.

A test scenario configured based on the test conditions as above is shown in Table 1.

TABLE 1

| | Test scenario configuration | Used devices |
|---|---|---|
| Scenario 1 | Terminal 1 (reference terminal) is used for both public measurement and private measurement | Terminal 1: notebook (reference terminal) |
| Scenario 2 | Public measurement: Terminal 1 Private measurement: Terminal 2 | Terminal 1: notebook (reference terminal) Terminal 2: smart phone 1 |
| Scenario 3 | Public measurement: Terminal 1 Private measurement: Random (terminal 2, terminal 3, or terminal 4) | Terminal 1: notebook (reference terminal) Terminal 2: smart phone 1 Terminal 3: smart phone 2 Terminal 4: smart phone 3 |

The location estimation performance of the wireless network element measured using the RSSI information in the test scenario environment is shown in Table 2.

TABLE 2

| | Scenario 1 | Scenario 2 (before compensation) | Scenario 2 (after compensation) | Scenario 3 (before compensation) | Scenario 3 (after compensation) |
|---|---|---|---|---|---|
| WiFi AP location estimation distance error (m) | 0.98 | 2.94 | 0.33 | 2.63 | 1.78 |
| Increase of accuracy | | | 89% error reduction compared to before compensation | | 32% error reduction compared to before compensation |

Conclusively, the compensation method suggested by the embodiments of the present invention shows an error reduction effect of about 89% to the maximum according to scenarios when a location of a wireless network element is estimated using heterogeneous terminals.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A positioning method implemented by a computer, the positioning method comprising:

receiving information on a received signal strength indication (RSSI) of a wireless network element and location information of a heterogeneous terminal from the heterogeneous terminal by a wireless network element positioning server;

compensating the information on the RSSI received from the heterogeneous terminal into information on an RSSI received from a predetermined reference terminal, using a difference value model of the RSSI of the wireless network element between heterogeneous terminals, the difference model generated in advance; and estimating a location of the wireless network element using the compensated information on the RSSI from the reference terminal and the received location information.

2. The positioning method of claim 1, wherein the information on the RSSI received from the heterogeneous terminal comprises information measured in the heterogeneous terminal that communicates with the wireless network element.

3. The positioning method of claim 1, wherein the information on the RSSI received from the heterogeneous terminal is compensated into the information on the RSSI received from the reference terminal, by differentiating an average of difference values of the RSSI of the wireless network element between the heterogeneous terminals in the RSSI of the heterogeneous terminal.

4. The positioning method of claim 1, wherein the estimating of the location of the wireless network element comprises:
estimating the location of the wireless network element using a weighted least square utilizing the information on the RSSI received from the reference terminal.

5. The positioning method of claim 1, further comprising, after the estimating, estimating the location of the wireless network element using a trilateration method utilizing the information on the RSSI received from the reference terminal with reference to the estimated location of the wireless network element.

6. The positioning method of claim 1, wherein the difference value model of the RSSI of the wireless network element between the heterogeneous terminals is generated based on analysis of characteristics with respect to the RSSI received from each heterogeneous terminal.

7. The positioning method of claim 1, further comprising:
constructing a database (DB) using the difference value model of the RSSI between the heterogeneous terminals.

8. The positioning method of claim 7, wherein the DB stores at least one selected from an average of difference values of the RSSI of the wireless network element between the heterogeneous terminals, a distribution of the difference values of the RSSI of the wireless network element between the heterogeneous terminals, and a standard deviation of the difference values of the RSSI of the wireless network element between the heterogeneous terminals.

9. The positioning method of claim 8, further comprising:
estimating reliability of the compensated information on the RSSI received from the reference terminal, using at least one selected from the distribution of the difference values of the RSSI of the wireless network element between the heterogeneous terminals and the standard deviation of the difference values of the RSSI of the wireless network element between the heterogeneous terminals.

10. The positioning method of claim 1, further comprising selecting a heterogeneous terminal that normalizes the information on the RSSI received from the heterogeneous terminal, among a plurality of heterogeneous terminals, as the reference terminal.

11. A positioning server for a wireless network element, the positioning server comprising:
- an information receiving unit to receive information on received signal strength indication (RSSI) of a wireless network element and location information of a heterogeneous terminal from the heterogeneous terminal;
- an RSSI compensation unit to compensate the information on the RSSI received from the heterogeneous terminal into information on an RSSI received from a predetermined reference terminal, using a difference value model of the RSSI of the wireless network element between heterogeneous terminals, the difference model generated in advance; and
- a location estimation unit to estimate a location of the wireless network element using the compensated information on the RSSI from the reference terminal and the received location information.

12. The positioning server of claim 11, wherein the information on the RSSI received from the heterogeneous terminal is measured by the heterogeneous terminal that communicates with the wireless network element.

13. The positioning server of claim 11, wherein the RSSI compensation unit compensates the information on the RSSI received from the heterogeneous terminal into the information on the RSSI received from the reference terminal, by differentiating an average of difference values of the RSSI of the wireless network element between the heterogeneous terminals in the RSSI of the heterogeneous terminal.

14. The positioning server of claim 11, wherein the location estimation unit estimates the location of the wireless network element using a weighted least square method that utilizes the information on the RSSI received from the reference terminal.

15. The positioning server of claim 11, wherein the location estimation unit estimates the location of the wireless network element using a trilateration method utilizing the information on the RSSI received from the reference terminal with reference to the estimated location of the wireless network element.

16. The positioning server of claim 11, wherein the difference value model is generated based on analysis of characteristics with respect to the RSSI received from each heterogeneous terminal.

17. The positioning server of claim 11, further comprising a database (DB) to store the difference value model of the RSSI between heterogeneous terminals.

18. The positioning server of claim 17, wherein the DB stores at least one selected from an average of difference values of the RSSI of the wireless network element between the heterogeneous terminals, a distribution of the difference values of the RSSI of the wireless network element between the heterogeneous terminals, and a standard deviation of the difference values of the RSSI of the wireless network element between the heterogeneous terminals.

19. The positioning server of claim 18, further comprising a reliability estimation unit to estimate reliability of the compensated information on the RSSI received from the reference terminal, using at least one selected from the distribution of the difference values of the RSSI of the wireless network element between the heterogeneous terminals and the standard deviation of the difference values of the RSSI of the wireless network element between the heterogeneous terminals.

20. The positioning server of claim 11, further comprising a reference terminal selection unit to select a heterogeneous terminal that normalizes the information on the RSSI received from the heterogeneous terminal, among a plurality of heterogeneous terminals, as the reference terminal.

* * * * *